July 12, 1932. W. R. LEWIS ET AL 1,867,084
BAILING LINE CLAMP
Filed March 9, 1931
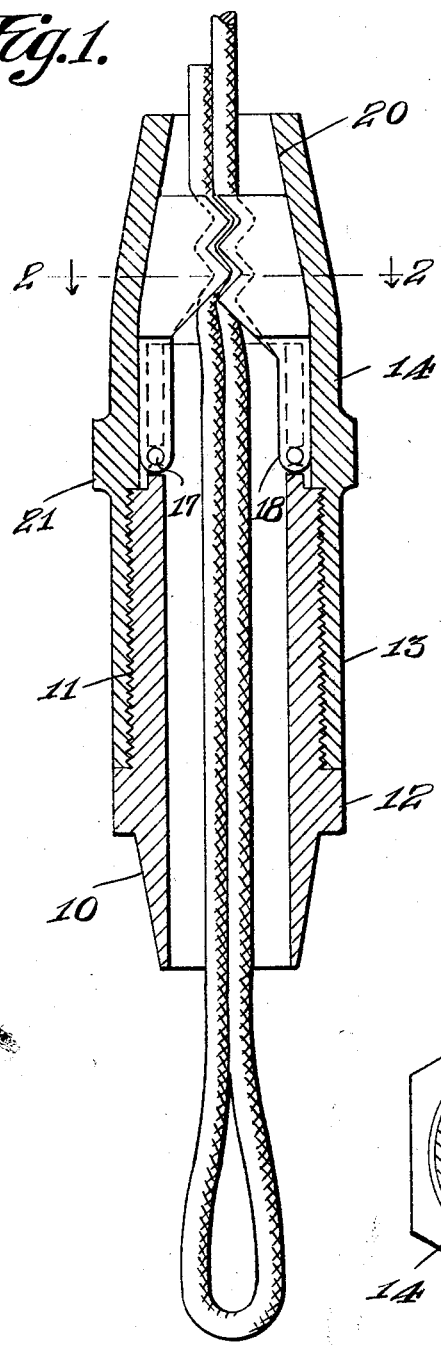
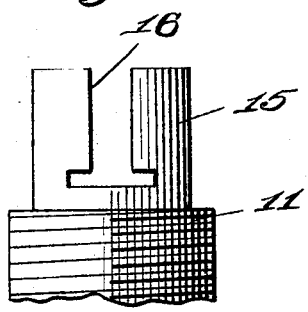
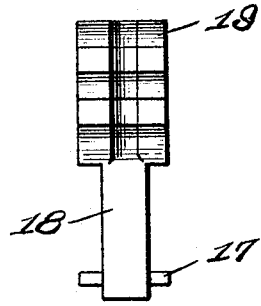
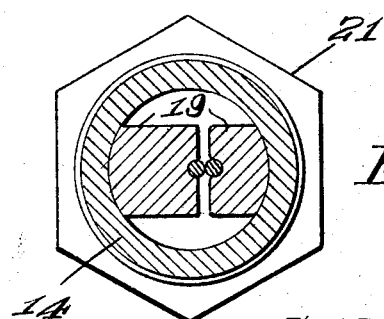
W. R. Lewis,
H. J. Weaver,
INVENTOR
BY Victor J. Evans
and Co.
ATTORNEYS Patented July 12, 1932

1,867,084

UNITED STATES PATENT OFFICE

WILBUR R. LEWIS AND HARRY J. WEAVER, OF SARATOGA, TEXAS

BAILING LINE CLAMP

Application filed March 9, 1931. Serial No. 521,243.

This invention relates to rope grips for line clamps for bailers, swabs and the like for use within well tubes and the like.

One of the principal objects of the invention consists of a device of this character having progressive gripping elements designed for the formation and maintenance of a loop in a line for the above work.

An additional object of the invention contemplates the provision and arrangement of adjusting means for the gripping means to regulate the bite of the latter with respect to the grippingly engaged portions of the line.

More specifically stated the adjusting means extends for appreciable distances beyond the gripping connection to provide a guide for the looped end of the line.

With the above and other objects in view, the invention further consists of the following novel features and details of construction, to be hereinafter more fully described, illustrated in the accompanying drawing and pointed out in the appended claims.

In the drawing:—

Figure 1 is a longitudinal sectional view taken through the invention while in active use.

Figure 2 is a horizontal sectional view taken on line 2—2 of Figure 1.

Figure 3 is an enlarged fragmentary elevation of one of the gripping elements.

Figure 4 is an elevation of one of the gripping members.

Referring to the drawing in detail wherein like characters of reference denote corresponding parts, the reference character 10 indicates generally a sleeve section exteriorly threaded, as at 11, for an appreciable portion of its length. An annular shoulder 12, carried upon the outer surface of the sleeve section and transversely thereof, provides a stop against which the adjacent end of the telescoping end 13 of a sleeve section 14 reposes. It is obviously apparent from the Figure 1 illustration that the telescopically associated portions of the sleeve sections 10 and 14 respectively are threadedly engaged.

A reduced extension 15 of tubular formation, projecting from the innermost telescopically associated extremity of the sleeve section 10 and free from contacting engagement with the inner wall of the sleeve section 14, is provided with substantially inverted diametrically opposed T-shaped slots 16. The transverse portions of the T-shaped slots extend for appreciable depths to accommodate cross pins or trunnions 17. Arm members 18 carried by the cross pins or trunnions 17 and laterally shiftable therewith to facilitate expanding and contracting of the arm members whereby the two thicknesses of the line or rope may be grippingly engaged between the toothed faces 19 thereof. The toothed faces of the arm members project inwardly toward the center of the communicating bore established between the two sleeve sections and in the path of movement of the several lengths of line therethrough to grippingly retain same axially of the longitudinal center of the clamp whereby chafing, abrasion or other injurious effects, due to contact of the line or rope with any portion of the clamp other than the toothed faces of the arm members will be prevented. The outer portions of the toothed faces of the arm members are inwardly inclined longitudinally thereof in conformity to the conical wall portion 20 of the sleeve section 14 whereby the jaws or other faces of the arm members 18 may be actuated or otherwise regulated, incident to rotary motion of the sleeve section 14 after the manner of the conventional form of drill or auger chuck.

As suggested in the Figure 2 illustration, the annular flange portion 12 of the sleeve section 10, as well as the flange portion 21 upon the sleeve section 14, may be in the nature of wrench engaging portions by means of which the clamp may be adjusted through the use of tools.

Although we have described the present invention as having special application upon bailing lines in well tube work, it is obviously apparent that a clamp of this character could be equally and effectually as well employed for establishing non-slipping loops in other forms of lines for different purposes.

The invention is susceptible of various changes in its form, proportions and minor details of construction and the right is herein reserved to make such changes as properly fall within the scope of the appended claims.

Having described the invention, what is claimed is:

1. In a line clamp for well bailing, a gripping apparatus embodying telescopically associated sleeve sections threadedly connected for progressive adjustment, a tubular extension formed upon the innermost end of the housed sleeve section having inverted T-shaped slots within diametrically opposite sides thereof, arm members disposed within the longitudinal portions of the slots having cross pins rockingly mounted within the transverse portions of the slots, toothed faces for the arm members disposed axially of the longitudinal center of the apparatus to grippingly engage the thicknesses of the bailing line passing therethrough, said arm members and one of the sleeve sections being shaped to regulate clearance between the toothed faces coincident with the progressive adjustment of the sections.

2. In a line clamp for well bailing, a gripping apparatus embodying adjustably connected sleeve sections, a tubular extension formed upon the innermost end of one of the sleeve sections and having diametrically opposed inverted T-shaped slots, a pair of gripping members having toothed faces mounted in the T-shaped slots for rocking movement, said gripping members and one of the sleeve sections being shaped to regulate clearance between the toothed faces coincident with the progressive adjustment of the sections.

In testimony whereof we affix our signatures.

HARRY J. WEAVER.
WILBUR R. LEWIS.